(No Model.)
J. CAMPBELL.
COMBINED CORN PLANTER AND FERTILIZER DISTRIBUTER.
No. 324,983. Patented Aug. 25, 1885.
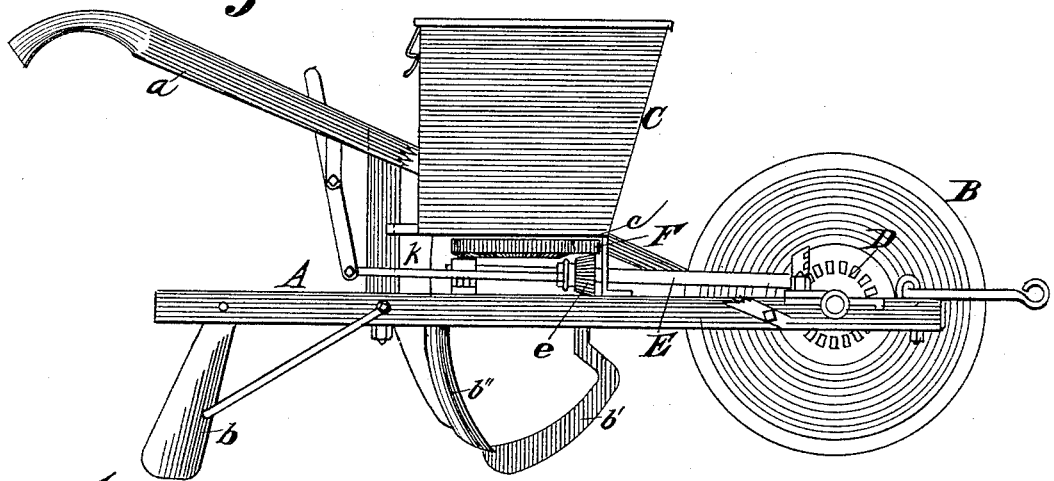
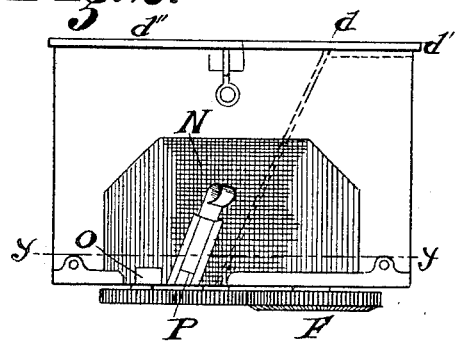
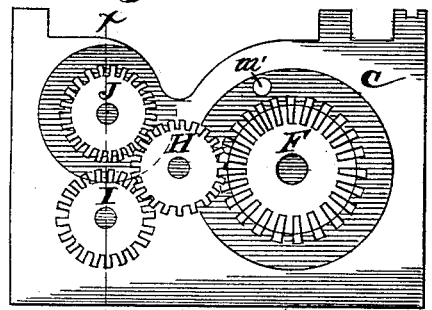
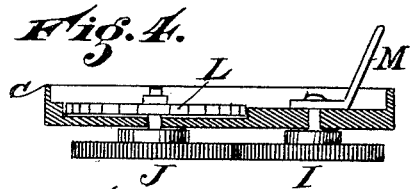
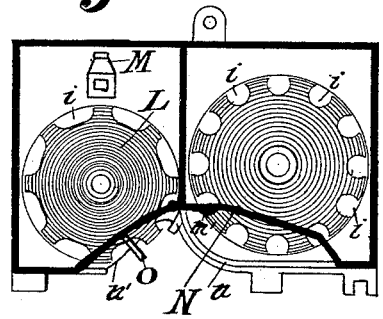
Attest
Jos. H. Sims
M. E. Milliken
Inventor
James Campbell
by Wood & Boyd
his Attorneys &c
N. PETERS, Photo-Lithographer, Washington, D. C.

United States Patent Office.

JAMES CAMPBELL, OF HARRISON, OHIO.

COMBINED CORN-PLANTER AND FERTILIZER-DISTRIBUTER.

SPECIFICATION forming part of Letters Patent No. 324,983, dated August 25, 1885.

Application filed September 27, 1884. (No model.)

*To all whom it may concern:*

Be it known that I, JAMES CAMPBELL, a resident of Harrison, in the county of Hamilton and State of Ohio, have invented certain new and useful Improvements in Combined Corn-Planter and Fertilizer-Distributer, of which the following is a specification.

My invention relates to an improvement in a combined seed-planter and fertilizer distributer.

The object of my invention is to produce a pilot-wheel corn-planter with a fertilizing attachment, so constructed and arranged that the fertilizing material can be dropped with the corn, and so that the operator can see the dropping operation upon the rear side of the box.

Another object of my invention is to combine with the corn-planter operated by a pilot driving-wheel, which conveys motion to the planting devices, a fertilizing device driven from the same bevel-gear that operates the corn-dropper, to drop the fertilizer at or near the same point that the corn is dropped.

Other objects of my invention will be more particularly set forth in the description of the accompanying drawings, making a part of this specification, in which—

Figure 1 is a side elevation of my improved corn-planter; Fig. 2, a rear elevation of the combined hopper; Fig. 3, a plan view of the driving-gear; Fig. 4, a section on line $x\,x$, Fig. 3; Fig. 5, a section on line $y\,y$, Fig. 2.

A represents the frame of an ordinary pilot-wheel corn-planter; B, the driving-wheel; $a$, the handles for operating it; $b\,b'\,b''$, the furrow-opener and covering devices.

C represents the hopper. $c$ represents the bottom plate of the hopper. The hopper is divided into two compartments by partition $d$.

$d'\,d''$ represent lids covering the two seed-boxes. The lid $d'$ being within the lid $d''$ or compartment covered by it, by opening the lid $d''$ the fertilizing-compartment is exposed, and then by opening the lid $d'$ the corn-hopper is exposed. The hopper, however, might be made with two independent covers hinged to the partition $d$.

D represents the gear for driving shaft E. $e$ represents a transmitting bevel-gear meshing with bevel-gear on the under side of gear F, for operating the combined corn and fertilizing dropping devices. Gear F is likewise provided with spur-gear teeth on its outer peripheral edge, which mesh with the transmitting-gear H, and this in turn drives gear I and J.

K represents a corn-dropper plate provided with a series of holes, $i$, through which the seed is discharged into the spout $k$, attached to the rear under side of the hopper C.

In order to drop the fertilizer with the corn, it is necessary that the operator should be enabled to see the operation of the fertilizer device at the same time that he observes the operation of the corn-dropper. It is also necessary that the fertilizer have a stirrer to secure its discharge. I have accomplished these results by the following instrumentalities.

L represents a fertilizer-dropping disk, which is provided with large elongated openings $i$. This dropper-plate L works in a circular recess countersunk in the bottom plate $c$, and is driven by the transmitter J, being journaled upon the axis thereof. The hub of transmitter I projects up through the bottom of hopper C, and to it is attached a bent stirring-finger, M, which revolves with said gear I, passing around over the orifices $i$ in plate L, causing them to be filled with the fertilizer as they are moving within the hopper.

N represents the rear partition of hopper C, bent inward over the dropper-plates K L, as shown in Figs. 2 and 5.

$n$ represents a ledge or flange, turned up on the bottom plate, $c$, so as to prevent the corn from passing out over the edge of the box, and to confine the same in close proximity to the dropping-wheel K.

$n'$ represents the bottom plate, $c$, cut away so as to form an enlarged opening or space for discharging the fertilizing material L into the concave portion of the furrow-opener $b''$ through spout $k$. A short ledge is provided at the extreme outer portion, so as to prevent the fertilizer from being carried and discharged too far back on the dropping-plate, and so as to catch any surplus and hold it so as to be carried into the box by the notched plate L.

O represents a cut-off plate, projecting from partition N, and resting down upon the dropper-plate L, so that the fertilizer will be pushed into the concave furrow-opener $b''$, through spout $k$.

$m'$ represents an orifice through which the corn is dropped into the furrow-opener. By this arrangement of the seed-plates, the rear partition, N, and flanges n n', the seed and fertilizer are both carried outside of their respective hoppers, in full view of the operator, and drop through their respective orifices into the same hopper or spout k, leading to the furrow-opener b''.

P represents a gate or cut-off affixed to the rear edge of the hopper, so as to shut down upon the dropping-plate L and stop the escape of fertilizing material when it is desired to stop fertilizing and drop corn alone.

The mode herein shown and described of combining the fertilizing and corn-dropping devices is very simple and effective.

I claim—

1. The combination, in a pilot-wheel corn-planter, of the bevel gear-wheel F, driven from the pilot-wheel, the transmitting-gear H, engaging said bevel gear-wheel, the gear-wheels J and I, engaging the said transmitting-gear, the seed-dropping plate K, the fertilizer-dropping plate L, mounted on a spindle secured to the gear J, and an agitator or stirrer, M, connected with and operated by the gear I, substantially as described.

2. In a combined corn-planter and fertilizer-distributer, the combination of the corn-dropping disk K and the fertilizer-dropper disk L, geared together to drop the fertilizer at or near the same point as the corn, with the hopper C, having the rear portion, N, inwardly curved in circular form and extending over the two disks, and the bottom plate, c, having upwardly-turned flange n, substantially as described.

3. In combination with the bottom plate, c, of the hopper C, and fertilizing-dropper L, the bent partition N, the circular opening n', and cut-off O, for dropping the fertilizing material, substantially as specified.

4. In combination with the pilot-wheel of a corn-planter, the driving and transmitting gears, the dropping and fertilizing disks, simultaneously operated thereby, and the stirrer M, mounted upon the shaft of gear I, and revolving within the hopper over the dropper-plate L, substantially as specified.

5. In a combined corn-planter and fertilizer-distributer, the combination of the two dropper-plates K and L, geared together for simultaneously dropping the corn and fertilizer, with the hopper having the rear partition inwardly curved in circular form and extending across both dropping-disks, substantially as described.

In testimony whereof I have hereunto set my hand.

JAMES CAMPBELL.

Witnesses:
JOHN E. BRUCE,
JOHN S. ROEBUCH, Jr.